United States Patent
Hoyte et al.

(10) Patent No.: US 6,917,896 B2
(45) Date of Patent: Jul. 12, 2005

(54) METHOD AND APPARATUS FOR USING EDDY CURRENT TRANSDUCERS IN MAGNETIC FIELDS

(75) Inventors: Scott Mordin Hoyte, Carson City, NV (US); Jeremiah Robert Ferguson, Carson City, NV (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/723,496

(22) Filed: Nov. 26, 2003

(65) Prior Publication Data

US 2005/0114052 A1 May 26, 2005

(51) Int. Cl.⁷ .............................. G01B 7/02; G01B 7/14
(52) U.S. Cl. ...................................................... 702/158
(58) Field of Search .............................. 702/38, 56, 94, 702/95, 150–153, 155, 158; 324/207.11, 207.16, 662, 671, 699

(56) References Cited

U.S. PATENT DOCUMENTS

| | | | |
|---|---|---|---|
| 4,833,405 A | 5/1989 | Richards et al. | |
| 4,847,556 A | 7/1989 | Langley | |
| 5,055,784 A | 10/1991 | Jaeger et al. | |
| 5,058,434 A | 10/1991 | Zaschel | |
| 5,182,513 A | 1/1993 | Young et al. | |
| 5,247,253 A | 9/1993 | Bowman | |
| 5,332,966 A | 7/1994 | Berberich | |
| 5,339,031 A | 8/1994 | Chern | |
| 5,541,510 A | 7/1996 | Danielson | |
| 5,854,553 A | 12/1998 | Barclay et al. | |
| 6,664,782 B2 * | 12/2003 | Slates | 324/207.16 |
| 6,765,395 B2 * | 7/2004 | Slates | 324/699 |

* cited by examiner

*Primary Examiner*—Michael Nghiem
(74) *Attorney, Agent, or Firm*—Armstrong Teasdale LLP

(57) ABSTRACT

A method for measuring the distance of a gap separating an eddy current transducer and a target is provided. The method includes determining a normalized impedance curve for the transducer, determining a time rate of change of the normalized impedance of the transducer along a line of constant gap, and correcting an apparent gap magnitude using the determined time rate of change.

32 Claims, 4 Drawing Sheets

METHOD AND APPARATUS FOR USING EDDY CURRENT TRANSDUCERS IN MAGNETIC FIELDS

BACKGROUND OF THE INVENTION

The present invention relates generally to a digital impedance measurement system and, in particular, to a digital eddy current system used to facilitate reducing the sensitivity of an eddy current transducer to a magnetic field on a target.

At least some known eddy current proximity systems which analyze and monitor rotating and reciprocating machinery include signal conditioning circuitry and a proximity or eddy current transducer that is positioned proximate a target object, which may include, but is not limited to, a rotating shaft of the machine, or an outer race of a rolling element bearing. The proximity transducer may be a non-contacting device which measures displacement motion and the position of an observed conductive target material relative to the transducer. The target, proximity transducer, and conditioning circuitry components may interact such that a voltage output from the circuitry is directly proportional to a distance or "gap" between the transducer and the target.

The conditioning circuitry measures the electrical impedance (Zp) of the electrical combination of the target, the transducer including an integral sensing coil and cable, and the conditioning circuitry. The impedance is linearized and converted into a voltage that is directly proportional to the gap. The impedance is measured at a specific frequency that is a function of the conditioning circuitry. A target that is magnetized, either due to a residual magnetism or due to an induced magnetism, may cause the measured impedance to be inaccurate and unpredictable. For example, a magnetic field may be induced into the shaft of a rotating electrical machine during normal operation. However, because the magnetic field may be induced non-uniformly around the periphery of the shaft in an area where the proximity transducer may be monitoring, as the shaft rotates, the non-uniformity of the magnetic field may adversely affect the impedance value, which may in turn affect the output gap value.

As a result, at least some known proximity systems may include a calibration procedure to compensate for the effects of a uniform magnetic field. However, magnetic fields affecting targets are often non-uniform, making field calibration procedures impracticable.

BRIEF DESCRIPTION OF THE INVENTION

In one aspect, a method for measuring the distance of a gap separating an eddy current transducer and a target is provided. The method includes determining a normalized impedance curve for the transducer, determining a time rate of change of the normalized impedance of the transducer along a line of constant gap, and correcting an apparent gap magnitude using the determined time rate of change.

In another aspect, an apparatus for determining the distance of a gap between a proximity transducer and a conductive target material is provided. The apparatus includes a proximity transducer, and a processor operatively coupled to the transducer wherein the processor is configured to generate a normalized impedance curve for the transducer and the target, determine a time rate of change of the transducer normalized impedance along a line of constant gap, and correct an apparent gap magnitude using the determined time rate of change.

In yet another aspect, a computer program embodied on a computer readable medium for determining the distance of a gap separating a proximity transducer and a target is provided. The program includes a code segment that receives complex impedance information and then determines a normalized impedance curve for the transducer, determines a time rate of change of the normalized impedance of the transducer along a line of constant gap, and corrects an apparent gap magnitude using the determined time rate of change.

DETAILED DESCRIPTION OF THE INVENTION

Figure 1:
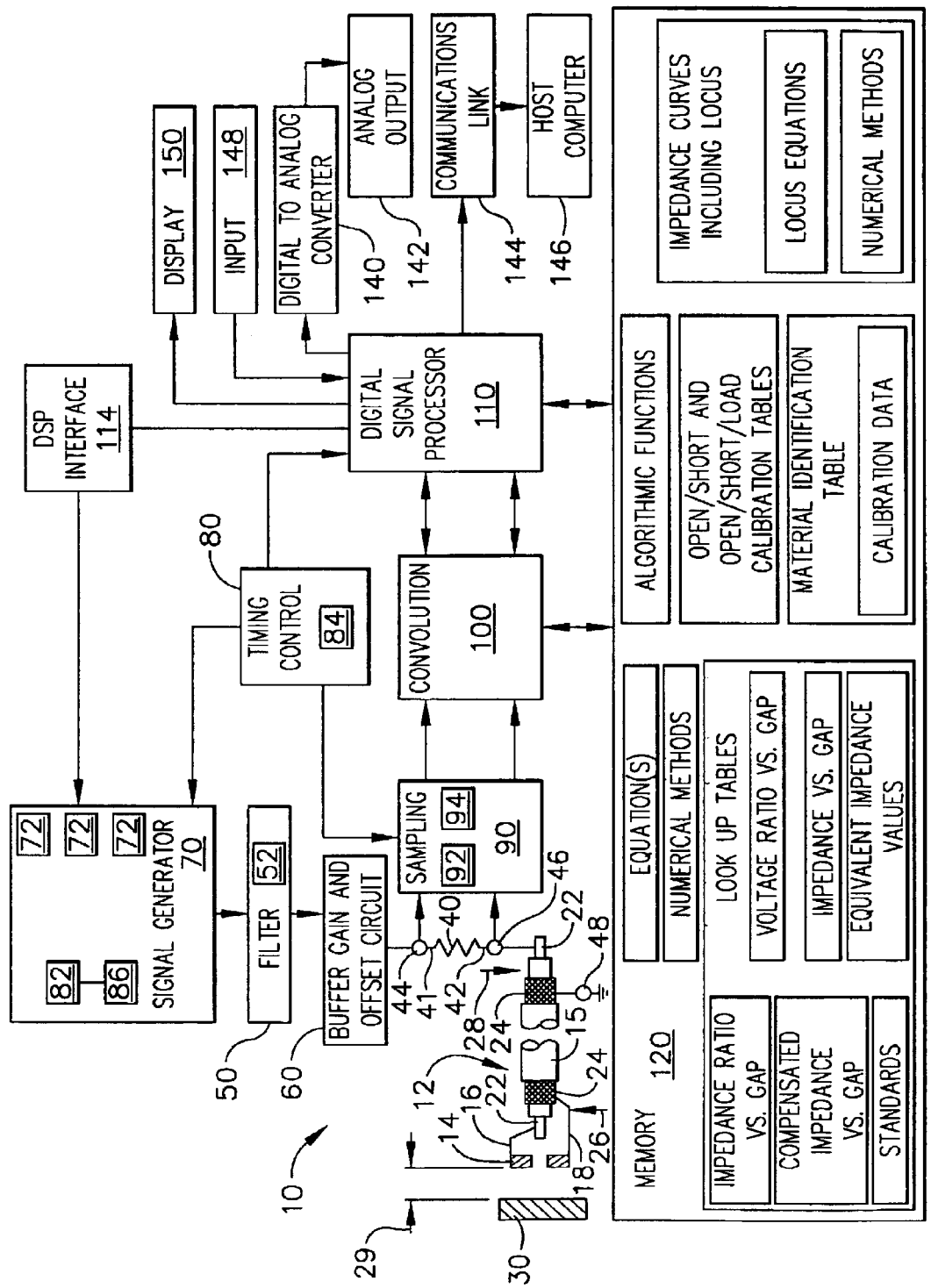
FIG. 1 is a schematic block diagram of an exemplary digital eddy current system.

FIG. 1 is a schematic block diagram of an exemplary digital eddy current system 10 that includes a transducer 12 operatively coupled to system 10. System 10 includes a voltage ratio method (VR method) used for digitally measuring an unknown electrical impedance of transducer 12. Transducer 12 includes an integral sensing element or coil 14 and a multi-conductor transducer cable 15. Sensing element 14 includes a first electrical lead 16 and a second electrical lead 18. Transducer cable 15 includes a first conductor 22 and a second conductor 24 extending from a first end 26 to a second end 28 of transducer cable 15.

At cable first end 26, first conductor 22 and second conductor 24 are each operatively coupled to the first electrical lead 16 and second electrical lead 18 of sensing element 14, respectively. At cable second end 28, first conductor 22 is coupled to second terminal 42 of resistor 40 at node 46 and second conductor 24 is coupled to ground node 48, thereby grounding one lead of the unknown dynamic transducer impedance $Z_{unknown}$.

In the exemplary embodiment, transducer 12 is coupled to a machine for sensing raw dynamic data that may be correlated to a gap distance 29 defined between transducer 12 and a conductive or metallic target 30, such as, but, not limited to a rotating shaft of the machine or an outer race of a rolling element bearing being monitored.

Digital eddy current system 10 includes a resistor 40 having a resistance value R, and a first terminal 41 and a second terminal 42 which are respectively coupled between a first node 44 and a second node 46.

Transducer 12 has an unknown dynamic transducer impedance having a value $Z_{unknown}$ and is coupled between second terminal 42 of resistor 40 at node 46 and a ground node 48. Accordingly, resistor 40 and transducer 12 form a serial electrical connection.

Digital eddy current system 10 also includes a filter 50, a signal generator 70, a timing control circuit 80, a sampling circuit 90, a convolution circuit 100 and a digital signal processor (DSP) 110. Signal generator 70 is operatively coupled to resistor first terminal 41 at node 44 through filter 50 for driving a signal through resistor 40, and transducer 12 thereby impressing a first voltage $V_1$ across serially connected resistor 40 and transducer 12, and a second voltage $V_2$ only across transducer 12. As used herein, the term "processor" also refers to microprocessors, central processing units (CPU), application specific integrated circuits (ASIC), logic circuits, and any other circuit or processor capable of executing inspection system, as described herein.

In the exemplary embodiment, signal generator 70 is operatively coupled to resistor 40 at node 44 via filter 50 and to digital signal processor (DSP) 110 for driving a programmable dynamic signal of one or more frequencies through filter 50 and the serial connection of the resistor 40/transducer 12 combination. Specifically, signal generator 70 includes a direct digital synthesis (DDS) device 72 that is operatively coupled to resistor first terminal 41 via filter 50 and buffer, gain and offset circuit 60 for driving the dynamic signal or waveform through resistor 40 and transducer 12.

This dynamic signal causes the first voltage $V_1$ to be impressed across the serial connection of resistor 40 and transducer 12 and causes the second voltage $V_2$ to be impressed only across transducer 12. In the exemplary embodiment, transducer sensing element 14 is coupled proximate target 30 such that this dynamic signal causes sensing element 14 to generate an alternating magnetic field that induces eddy currents in the metallic target 30. In turn, the eddy currents in target 30 induce a voltage in sensing element 14 and hence, a change in an impedance of transducer 12 which varies as a function of, for example, variations of gap distance 29 between transducer 12 and target 30.

In the exemplary embodiment, signal generator 70 includes a plurality of DDS devices 72 coupled to resistor first terminal 41 via filter 50 and buffer, gain and offset circuit 60 for driving a plurality of dynamic signals at different frequencies through resistor 40 and transducer 12, and subsequently performing processing including convolution for obtaining simultaneous impedance measurements of transducer 12 at different frequencies which may be correlated to gap distance 29 between transducer 12 and target 30.

Each DDS device 72 may be coupled to DSP 110 via interface 114 and generates a pure frequency/phase-programmable dynamic signal such as a sinusoidal wave. DSP 110 may include an algorithm to program both the frequency and the phase of the output signals which in turn may be used to drive transducer 12 with a frequency/phase-programmable dynamic analog signal having an output frequency/phase which may be precisely manipulated under full digital control. Therefore, each DDS device 72 may be digitally programmed to output sine waves at a plurality of frequencies/phases with precision for use as driving signals or reference signals. In one embodiment, DDS device 72 is a device such as part number AD9850 commercially available from Analog Devices, Norwood, Mass.

Filter 50 is electrically coupled between DDS device 72 and resistor 40 for filtering the analog dynamic signals output from DDS device 72. In the exemplary embodiment, filter 50 includes at least one low pass filter 52 electrically coupled between each DDS device 72 and first terminal 41 of resistor 40 to purify the output dynamic signals or waveforms of each DDS device 72 for eliminating, for example, harmonics created in DDS device 72. For example, as a result of the outputs of DDS devices 72 being ten plus bit digital to analog converters, the quantitization noise is filtered out using a low pass filter. Therefore, filters 52 remove the steps and facilitates smoothing out the analog dynamic signal outputs from DDS devices 72. Additionally, filters 52 facilitates reducing the noise bandwidth of the system 10 to improve a signal to noise ratio. In one embodiment, low pass filters 52 are five pole elliptical filter devices.

In the exemplary embodiment, buffer, gain and offset circuit 60 is electrically coupled between filter 50 and resistor 40 for buffering and amplifying the analog dynamic signals and providing any desired offset of the analog dynamic signals. Sampling circuit 90 is coupled to first node 44 for sampling and digitizing voltage $V_1$ impressed across the serially connected resistor 40/transducer 12 combination. Additionally, sampling circuit 90 is coupled to second node 46 for sampling and digitizing voltage $V_2$ that is impressed only across transducer 12. In the exemplary embodiment, sampling circuit 90 includes a pair of analog-to-digital converters (ADC) 92 and 94 coupled to first node 44 and second node 46 respectively for sampling and digitizing the first dynamic voltage $V_1$ and the second dynamic voltage $V_2$. In one embodiment, ADCs 92 and 94 are fourteen bit, wide bandwidth converters such as part number AD6644 commercially available from Analog Devices, Norwood, Mass.

Timing control circuit 80 provides synchronization between the output signal of signal generator 70 and the sampling rate of sampling circuit 90 such that the phase relationship between the output signal and samples is maintained. Timing control circuit 80 is operatively coupled to each DDS device 72, of ADCs 92 and 94, and to DSP 110. Therefore, DDS devices 72 are clocked by timing control circuit 80 such that the frequency of the output of DDS devices 72 is accurately set. Additionally, timing control circuit 80 provides synchronization between the output of DDS devices 72 and the sampling rate of ADCs 92 and 94 such that a phase relationship between the dynamic driving signal(s) and the sampled signals is maintained. Accordingly, sampling may be performed in synchrony with the dynamic driving signals.

Timing control circuit includes a quartz clock oscillator 84 is operatively coupled to each DDS device 72 for providing a clock signal to each DDS device 72.

DDS device 72 and ADC's 92 and 94 are also clocked by oscillator 84 to ensure a consistent phase between signal generator 70 and sampling circuit 90.

Convolution circuit 100 may be a stand-alone device in the form of, for example, a digital down counter (DDC). In the exemplary embodiment, convolution circuit 100 is coupled between sampling circuit 90 and DSP 110 to do the convolution operation. Analog-to-digital converted voltages $V_{1D}$ and $V_{2D}$ are received and convolved by convolution circuit 100 and then transmitted to DSP 110 as complex voltage numbers $V_{1C}$ and $V_{2C}$. Convolution circuit 100 may be programmed to process a predetermined frequency. In one embodiment, convolution circuit 100 is a digital down counter (DDC) such as part number HSP 50216, commercially available from Intersil Corporation, Milpitas, Calif.

In an alternative embodiment, digital convolution circuit 100 is integrally formed with digital signal processor 110 wherein DSP 110 is operatively coupled to ADCs 92 and 94 for receiving the first and second digitized voltage signals $V_{1D}$ and $V_{2D}$ from ADCs 92 and 94 and convolving the digitized voltages into respective complex voltage numbers $V_{1C}$ and $V_{2C}$ via integral convolution circuit 100. A DSP 110 having an integral convolution circuit 100 such as the 210XX series of devices is commercially available from Analog Devices, Norwood, Mass. The process of convolving the digitized voltages into respective complex voltage numbers $V_{1C}$ and $V_{2C}$ via convolution circuit 100 is defined as in-phase and quadrature detection or quadrature synthesis. The calculated impedance may be converted by the processor 110 into a voltage or gap value correlative to the gap distance 29 between transducer 12 and target 30, being monitored by using equation(s), algorithms, numerical methods or lookup tables stored in, for example, a memory 120 coupled to processor 110. The impedance or gap values may be outputted via a digital-to-analog converter 140 to an analog output 142. Analog output 142 may include, for example, alarms, relays, and circuit breakers that may be set to trip when the analog output is outside a predetermined nominal operating range.

The impedance or gap values may be outputted through a communications link 144 to a host computer 146 for further processing for the use of monitoring rotating or reciprocating machinery. An input 148, such as, but not limited to a keyboard, a pointing device, a voice command circuit and/or touch screen may be used to input data or modify settings of system 10 through a menu driven interface which may be viewed on a display 150. The input data may be used immediately in calculations or may be stored in memory 120 for later use. Display 150 may include, for example, a CRT or LCD monitor, and/or hardcopy device.

In operation, an RF signal is transmitted from transducer coil 14 such that an RF field is created around the transducer tip. In the exemplary embodiment, the RF field extends to a gap distance 29 greater than approximately 0.1 inches (100 mils). When target 30 is present in the RF field, eddy currents flow in the surface of target 30. A penetration depth of the eddy currents depends on a conductivity and permeability of target 30. For example, the penetration depth of E4140 steel is approximately 0.003 inches (3 mils). When transducer 12 is close enough to target 30 to cause eddy currents to flow in target 30, the RF signal is affected, in that, the RF signal amplitude is at a minimum when gap distance 29 between transducer 12 and target 30 is at a minimum, resulting in a maximum of eddy current flow in target 30. Similarly, the RF signal amplitude is at a maximum when gap distance 29 between transducer 12 and target 30 is at a maximum, resulting in a minimum of eddy current in target 30. Additionally, when target 30 is moving slowly within the RF field, the RF signal amplitude increases or decreases slowly. If the target is moving rapidly within the RF field, the RF signal amplitude increases or decreases rapidly. Oscillatory movement of target 30 causes the RF signal to modulate, such as when target 30 is vibrating in relation to transducer 12.

Figure 2:
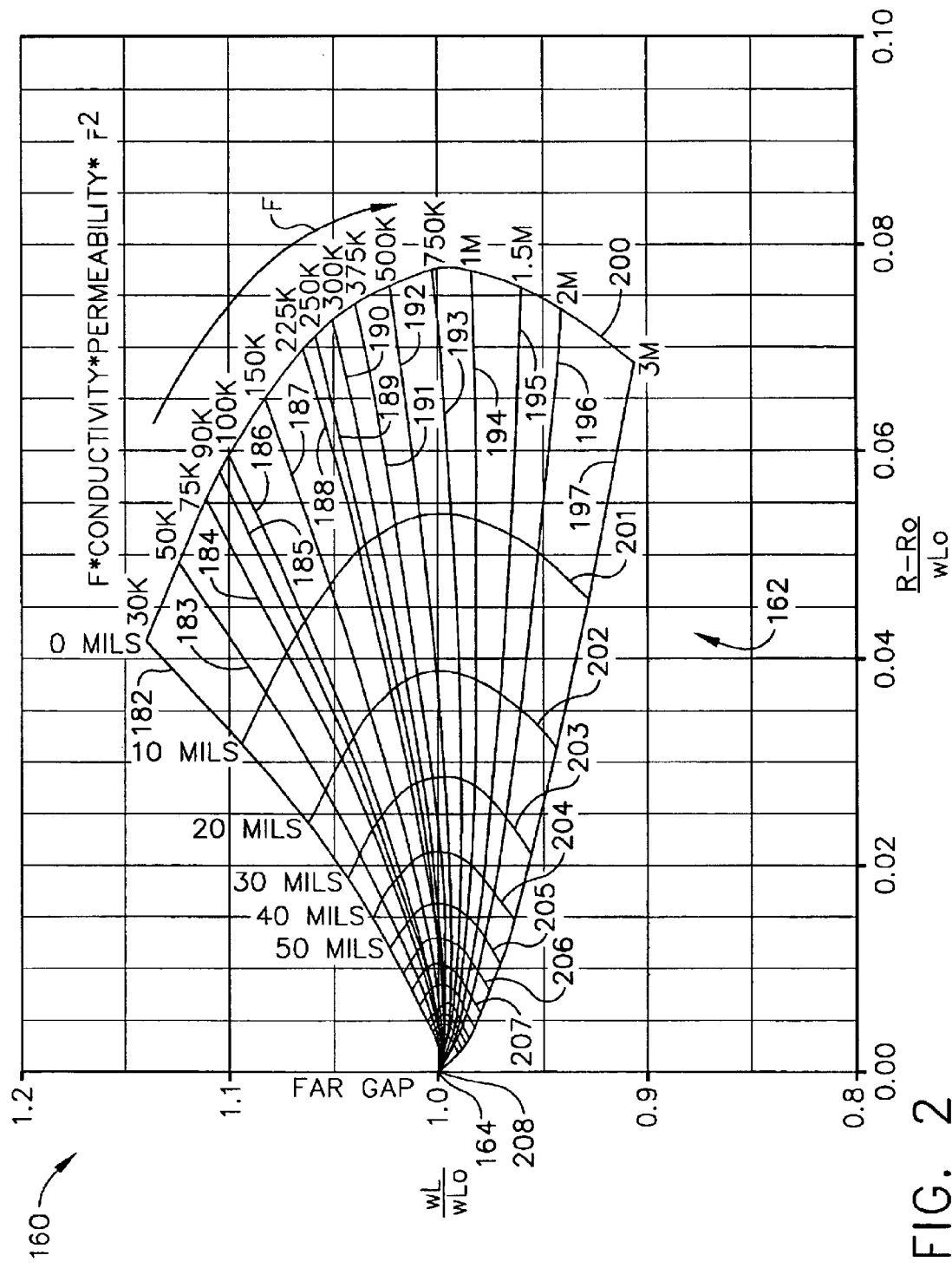
FIG. 2 illustrates a normalized impedance diagram for the transducer and target shown in FIG. 1.

FIG. 2 illustrates a normalized impedance diagram 160 for transducer 12 and target 30 that includes a plurality of normalized impedance curves 162. In the exemplary embodiment, diagram 160 is generated by measuring the impedance of transducer 12 at different excitation frequencies and at different gap distance values from target 30. In the one embodiment, target 30 is fabricated from E4140 steel. A plurality of lines 182 through 197 that radiate outward from an origin 164, located at 0.0, 1.0 on diagram 160, are gap lines. They represent the normalized impedance due to target 30 at a constant frequency and varying gap distance value that is changed from a near gap position, represented by the rightmost ends of the lines to a far gap position, represented by origin 164. These lines rotate clockwise along arrow F as the frequency is increased. A plurality of arcs 200 through 208 represent the impedance of transducer 12 when transducer 12 is located at a fixed gap distance value from target 30 as the excitation frequency is varied.

In operation, graph 160 may be determined by:
1. Measure a far gap impedance of transducer 12 wherein the far gap impedance=$R_0+j\omega L$.

2. Measure an impedance of transducer 12 near target 30 wherein near gap impedance=$R+j\omega L$.

3. Determine a normalized impedance which is comprised of a normalized resistance term and a normalized reactance term as follows:

Normalized resistance=$(R-R_0)/\omega L_0$ and

Normalized reactance=$\omega L/\omega L_0$.

4. Plot each point on diagram 160 and connect the points collected at the same frequency.

5. Connect the points collected at the same gap distance value thereby obtaining a graph as shown in FIG. 2.

Each target material has a unique characteristic normalized impedance diagram. The curves of each diagram are affected by the characteristics of the target and it has been observed that the curves rotate clockwise as the conductivity and permeability of the target increase. Also, it has been observed that there is a greater reactive change with gap distance than there is a resistive change as the conductivity and permeability of the target increase.

The above described method of determining a normalized impedance diagram may be used to measure the far gap and the near gap impedance of the transducer in combination with an extension cable to obtain a normalized impedance diagram of the transducer/extension cable combination.

Additionally, one or more normalized impedance curves may be generated by taking a transducer and measuring its impedance at different frequencies and different gap distance values with different target materials and storing this information in, for example, memory 120.

Figure 3:
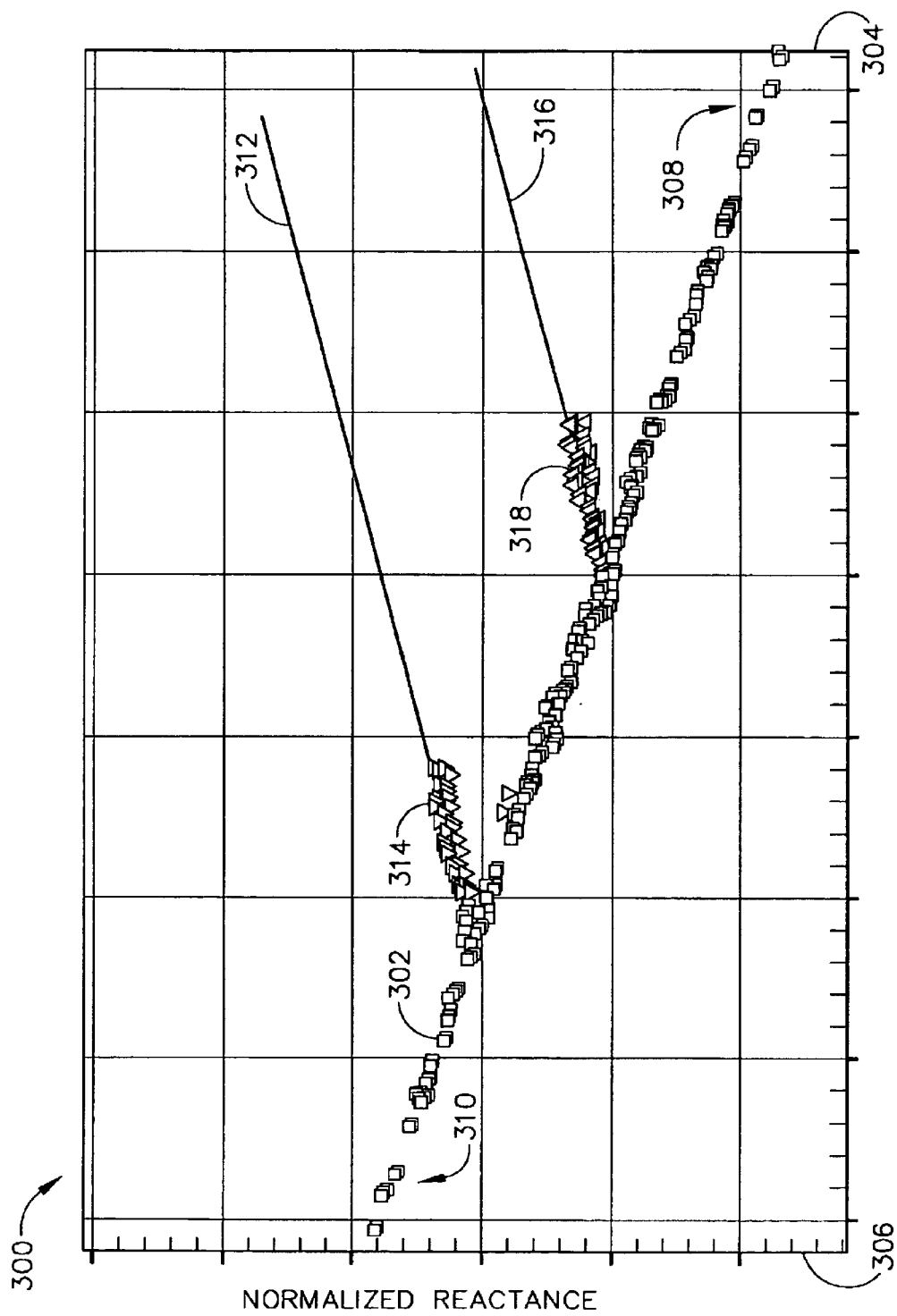
FIG. 3 is a graph of an exemplary normalized impedance curve shown in FIG. 2 with a magnetized target.

FIG. 3 is a graph 300 of an exemplary normalized impedance curve 302 for transducer 12 and a magnetized target 30 (shown in FIG. 1). In the exemplary embodiment, target 30 is fabricated from E4140 steel. Graph 300 includes an x-axis 304 that represents a normalized resistance of transducer 12. A y-axis 306 represents a normalized reactance of transducer 12. Graph 300 is comprised of a plurality of plotted points that together define normalized impedance curve 302 and that: each represents the impedance of transducer 12 at a predetermined frequency at a plurality of gap distances 29 between transducer 12 and target 30. A near gap end 308 of curve 302 includes points that represent the impedance of transducer 12 when target 30 is positioned in close proximity to transducer 12. A far gap end 310 of curve 302 includes points that represent the impedance of transducer 12 when target 30 is at a relatively far gap distance 29 from target 30. Curve 302 represents normalized impedance points for the condition wherein transducer 12 and target 30 are not influenced by an external magnetic field. When target 30 is not magnetized, magnetic fields of the crystal structure of target 30 may be aligned randomly, yielding no net magnetic field. When target 30 is positioned within an external magnetic field the individual crystal magnetic fields align with the lines of flux of the external magnetic field. When the external magnetic field is removed, target 30 may remain magnetized due to the magnetic moments of the individual crystals remaining aligned, yielding a net magnetic field in target 30. Magnetization of target 30 may influence the impedance of transducer 12 in a relation not necessarily related to gap distance 29, but related to magnetization strength and orientation of target 30 in addition to gap distance 29. Such relationship may be evidenced by a shift or displacement of curve 302.

The magnetization of target 30 follows a magnetization curve, or BH curve. For example, when target 30 is magnetized due to a sixty Hertz alternating magnetic field, the magnetization of target 30 may be traced around the BH curve sixty times per second. The permeability of target 30 follows a tangent of the BH curve. Therefore, as target 30 becomes more magnetized the permeability of target 30 decreases. This decrease in the permeability of target 30 appears as a shift in normalized impedance curve 302. For example, a first line of constant gap 312 may be superimposed on graph 300. When transducer 12 is held at a constant gap from target 30 and the magnetic field of target 30 is varied, the normalized impedance of transducer 12 may be plotted as points that define a lift-off line 314 along line 312. Additionally, the time rate of change of the position of a point along line 312 may be correlated to the strength and time rate of change of the target magnetic field.

A second line of constant gap 316 represents the impedance values when transducer 12 is held at a second constant gap from target 30 and the magnetic field of target 30 is varied, the normalized impedance of transducer 12 may be plotted as points that define a lift-off line 318 along line 316. Liftoff lines 314 and 318 for target 30: may be related to many factors. Gap, excitation frequency of transducer 12 and mean or effective radius of transducer 12 are known factors that are controllable with respect to transducer 12. Factors that may not be in relation to transducer 12 include target conductivity and permeability, which affect the normalized frequency. As such, a change in target conductivity and/or permeability may affect normalized impedance graph 300 similarly as shift in the operating frequency of transducer 12 affects normalized impedance graph 300. The relative orientation between target 30 and transducer 12 may also affect the representation of liftoff lines 314 or 318.

Figure 4:
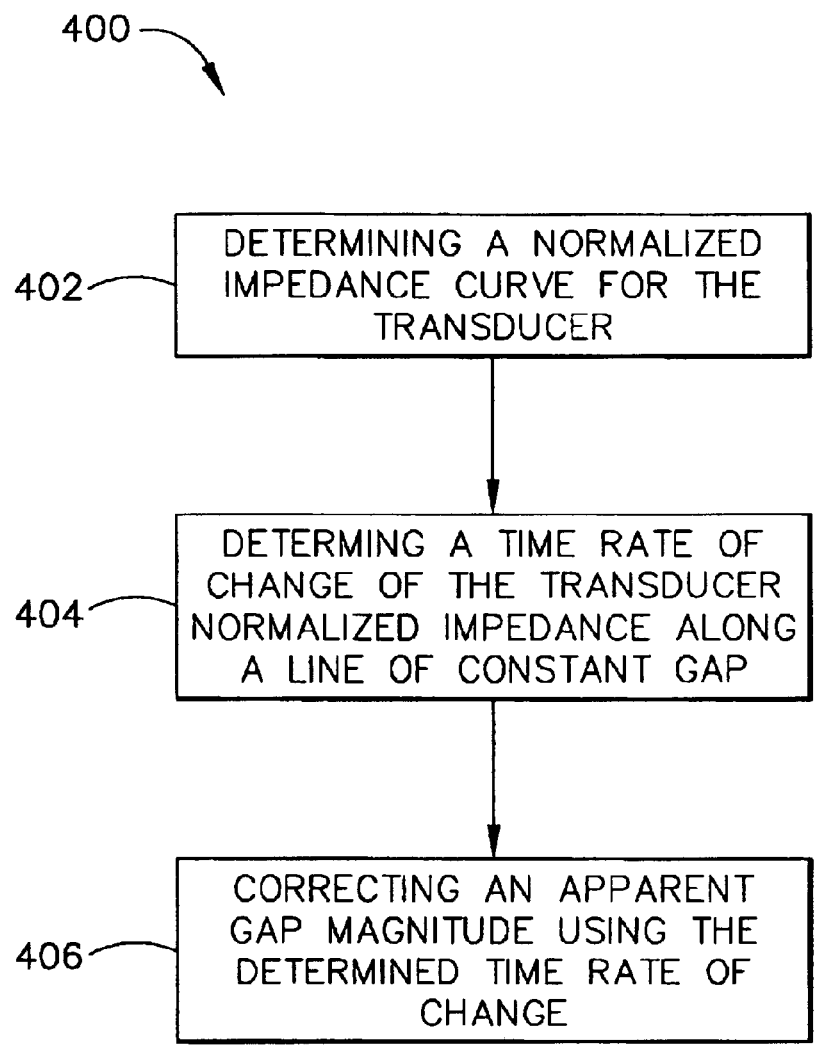
FIG. 4 is a flow diagram of an exemplary method for measuring a gap separating an eddy current transducer and a target.

FIG. 4 is a flow diagram of an exemplary method 400 for measuring a gap separating an eddy current transducer 12 and a target 30. Method 400 includes determining 402 a normalized impedance curve for the transducer. In the exemplary embodiment, the normalized impedance curve is determined in real-time. As used herein, real-time refers to outcomes occurring at a substantially short period after a change in the inputs affecting the outcome. The period may be the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome or may be a delay inherent in the components that comprise the system. In an alternative embodiment, the normalized impedance curve is predetermined, such as by a calibration procedure, and stored in a memory of system 10. A time rate of change of the transducer normalized impedance along a line of constant gap is determined 404. As the target is influenced by an external magnetic field, such as by a field induced into a rotating shaft of a motor or generator, the impedance of the transducer may change as a function of the strength of the magnetic field and/or the time rate of change of the magnetic field. The change in impedance may appear as a change in the gap separating the transducer and the target even though no change in the gap has occurred. To facilitate reducing inaccuracy of system 10 during operation, the apparent gap may be corrected 406 using the determined time rate of change of the transducer impedance along a line of constant gap on the normalized impedance curve The distance that the transducer impedance moves from the normalized impedance curve along a line of constant gap may also be used to correct 406 the apparent gap.

The above-described methods and apparatus provide a cost-effective and reliable means for measuring gap accurately in the presence of external magnetic fields. More specifically, the methods and apparatus facilitate utilizing an eddy current transducer to measure proximity and/or vibration of a target in relation to the transducer when the target is influenced by a magnetic field. As a result, the methods and apparatus described herein facilitate monitoring equipment in a cost-effective and reliable manner.

While the present invention is described with reference to measuring gap and/or vibration between an eddy current transducer and a target, numerous other applications are contemplated. For example, it is contemplated that the present invention may be applied to any system wherein a device may be influenced by an alternating and/or stationary magnetic field, such as, but not limited to, process system measurements and instrumentation systems.

Exemplary embodiments of eddy current impedance measurement systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for measuring the distance of a gap separating an eddy current transducer and a target, said method comprising:

determining a normalized impedance curve for the transducer;

determining a time rate of change of the normalized impedance of the transducer along a line of constant gap; and correcting an apparent gap magnitude using the determined time rate of change.

2. A method in accordance with claim 1 wherein determining a normalized impedance curve comprises:

calculating a complex electrical impedance value of the eddy current transducer at a plurality of gap distance values; and normalizing the complex electrical impedance value.

3. A method in accordance with claim 1 wherein determining a normalized impedance curve comprises determining a normalized impedance curve in real-time.

4. A method in accordance with claim 1 wherein determining a time rate of change comprises determining a time rate of change due to a magnetic field of the target.

5. A method in accordance with claim 1 wherein correcting an apparent gap comprises correcting the apparent gap to facilitate reducing a contribution to the apparent gap by a magnetic field of the target.

6. A method in accordance with claim 1 wherein a time rate of change of the distance separating the eddy current transducer and the target represents a vibration of the target, said method further comprising correcting an apparent vibration magnitude using the determined time rate of change.

7. A method in accordance with claim 6 wherein the target is a rotatable shaft, said method comprising correcting an apparent vibration magnitude of the rotating shaft using the determined time rate of change.

8. A method in accordance with claim 7 wherein the rotatable shaft is at least partially magnetized and wherein rotating the shaft induces an alternating magnetic field, said method comprises:

sensing the alternating magnetic field using the transducer; and correcting an apparent vibration magnitude of the rotating shaft due to the alternating magnetic field using the determined time rate of change.

9. A method in accordance with claim 1 further comprising determining the strength of a magnetic field based on the time rate of change of the transducer normalized impedance along a line of constant gap.

10. A method in accordance with claim 1 further comprising determining whether the target has been exposed to an external magnetic field.

11. A method in accordance with claim 1 further comprising determining an orientation of the target in a magnetic field with respect to the eddy current transducer.

12. A method in accordance with claim 1 further comprising modifying a proximity algorithm to facilitate modifying the transducer output signal due to external magnetic fields.

13. A method for measuring a gap distance separating an eddy current transducer and a target, said method comprising:

calculating a complex electrical impedance value of the eddy current transducer at a plurality of gap distance values;

normalizing the complex electrical impedance value;

determining a time rate of change of the normalized impedance of the transducer along a line of constant gap; and correcting an apparent gap magnitude using the determined time rate of change to facilitate reducing a contribution to the apparent gap by a magnetic field of the target.

14. A method in accordance with claim 13 wherein the target is a rotatable shaft and wherein a time rate of change of the gap distance separating the eddy current transducer and the target represents a vibration of the rotatable shaft, said method further comprising correcting an apparent vibration magnitude using the determined time rate of change.

15. An apparatus for determining the distance of a gap between an eddy current transducer and a conductive target material, said apparatus comprising:

an eddy current transducer; and a processor operatively coupled to said transducer, said processor configured to:

generate a normalized impedance curve for said transducer and said target;

determine a time rate of change of the transducer normalized impedance along a line of constant gap; and correct an apparent gap magnitude using the determined time rate of change.

16. An apparatus in accordance with claim 15 further comprising:

a signal generator operatively coupled to said eddy current transducer configured to drive a current through said eddy current transducer;

a sampling circuit configured to sample and digitize an analog voltage impressed across said eddy current transducer; and a convolver circuit for convolving the digitized voltage with a digital waveform for forming a complex number correlative to the analog voltage impressed across said eddy current transducer wherein said processor is configured to process the complex number into a gap distance value correlative to a gap distance between said eddy current transducer and the conductive target material.

17. An apparatus in accordance with claim 16 wherein said processor is configured to process the eddy current transducer impedance and a measured frequency of the current driving said eddy current transducer to generate a normalized impedance curve.

18. An apparatus in accordance with claim 16 wherein said signal generator is configured to adjust the frequency of the current driving said eddy current transducer.

19. An apparatus in accordance with claim 16 further comprising an output circuit configured to output a signal as a function of the gap distance value which is correlative to said gap distance between said eddy current transducer and said conductive target material.

20. An apparatus in accordance with claim 19 wherein said output circuit further comprises at least one of a display, a digital signal output, and an analog signal output.

21. A computer program embodied on a computer readable medium for determining the distance of a gap separating a eddy current transducer and a target, said program comprising a code segment that receives complex impedance information and then:

determines a normalized impedance curve for the transducer;

determines a time rate of change of the normalized impedance of the transducer along a line of constant gap; and corrects an apparent gap magnitude using the determined time rate of change.

22. A computer program in accordance with claim 21 further comprising a code segment that:

calculating a complex electrical impedance value of the eddy current transducer at a plurality of gap distance values; and normalizing the complex electrical impedance value.

23. A computer program in accordance with claim 21 further comprising a code segment that determines a normalized impedance curve in real-time.

24. A computer program in accordance with claim 21 further comprising a code segment that determines a time rate of change due to a magnetic field of the target.

25. A computer program in accordance with claim 21 further comprising a code segment that corrects the apparent gap to facilitate reducing a contribution to the apparent gap by a magnetic field of the target.

26. A computer program in accordance with claim 21 wherein a time rate of change of the gap distance separating the eddy current transducer and the target represents a vibration of the target, said computer program further comprising a code segment that corrects an apparent vibration magnitude using the determined time rate of change.

27. A computer program in accordance with claim 26 wherein the target is a rotatable shaft, said computer program further comprising a code segment that corrects an apparent vibration magnitude of the rotating shaft using the determined time rate of change.

28. A computer program in accordance with claim 27 wherein the rotatable shaft is at least partially magnetized and wherein rotating the shaft induces an alternating magnetic field sensed by the transducer, said computer program further comprising a code segment that corrects an apparent vibration magnitude of the rotating shaft due to the alternating magnetic field using the determined time rate of change.

29. A computer program in accordance with claim 21 further comprising a code segment that determines the strength of the magnetic field based on the time rate of change of the transducer normalized impedance along a line of constant gap.

30. A computer program in accordance with claim 21 further comprising a code segment that determines whether a target has been exposed to an external magnetic field.

31. A computer program in accordance with claim 21 further comprising a code segment that determines an orientation of the target in a magnetic field with respect to the eddy current transducer.

32. A computer program in accordance with claim 21 further comprising a code segment that modifies a proximity algorithm to facilitate modifying the transducer output signal due to external magnetic fields.

* * * * *